US012645938B2

(12) United States Patent
Habite et al.

(10) Patent No.: US 12,645,938 B2
(45) Date of Patent: Jun. 2, 2026

(54) COMPUTER-IMPLEMENTED METHOD AND A COMPUTER SYSTEM FOR GENERATING A TRAINING DATASET FOR TRAINING AN ARTIFICIAL NEURAL NETWORK

(71) Applicant: MICROTEC AB, Linköping (SE)

(72) Inventors: Tadios Habite, Växjö (SE); Osama Abdeljaber, Växjö (SE); Anders Olsson, Växjö (SE)

(73) Assignee: MICROTEC AB, Linköping (SE)

( * ) Notice: Subject to any disclaimer, the term of this patent is extended or adjusted under 35 U.S.C. 154(b) by 896 days.

(21) Appl. No.: 18/048,062

(22) Filed: Oct. 20, 2022

(65) Prior Publication Data

US 2023/0131223 A1 Apr. 27, 2023

(30) Foreign Application Priority Data

Oct. 22, 2021 (IT) ........................ 102021000027284

(51) Int. Cl.
G06N 3/08 (2023.01)
(52) U.S. Cl.
CPC ..................................... G06N 3/08 (2013.01)
(58) Field of Classification Search
None
See application file for complete search history.

(56) References Cited

U.S. PATENT DOCUMENTS 4,831,545 A 5/1989 Floyd et al.
4,916,629 A 4/1990 Bogue et al.

2008/0078473 A1 4/2008 Huang et al.
2008/0140248 A1 6/2008 Moore
2008/0246971 A1 10/2008 Huang et al.
2008/0283151 A1 11/2008 Floyd et al.
(Continued)

OTHER PUBLICATIONS

Marc Oliver Kuehn, "The Automatic Detection and Rectification of Surface and Aesthetic Defects in the Production of Wooden Panels", Sep. 2015, PhD Thesis, Coventry University, 2016.
(Continued)

*Primary Examiner* — Leon Flores
(74) *Attorney, Agent, or Firm* — Chrisman Gallo Tochtrop LLC

(57) ABSTRACT

A computer-implemented method for generating a training dataset for training an artificial neural network configured to use images of lateral faces of a timber board to provide information about structure and/or defects, the method including;
  a log generation step during which a virtual model of a log is generated;
  a sawing step of the virtual model to obtain one or more virtual timber boards;
  a pattern step during which a surface pattern is determined as the intersection between the virtual lateral face and the internal structure and/or defects;
  a rendering step during which a rendered surface image of the lateral face of the virtual timber board is created; and
  an input data generation step during which the rendered surface images are used to create one or more item of input data;
  an output data generation step during which an item of output data is generated; and
  a population step during which a record is added to the training dataset comprising the item of input data, in combination with the item of output data.

22 Claims, 10 Drawing Sheets

(56) References Cited

U.S. PATENT DOCUMENTS

| | | |
|---|---|---|
| 2018/0137390 A1 | 5/2018 | Brundage et al. |
| 2019/0227049 A1* | 7/2019 | Narasimhan ............ G06F 15/76 |
| 2020/0184620 A1 | 6/2020 | Biernacki |
| 2021/0287430 A1 | 9/2021 | Li et al. |

OTHER PUBLICATIONS

Blouin, D., et al., Wood Quality Of Norway Spruce Grown In Plantations In Quebec. Wood and Fiber Science; vol. 26, No. 3; 1994; pp. 342-353.

Ormarsson, S., et al., A Numerical Study Of The Shape Stability Of Sawn Timber Subjected To Moisture Variation: Part 2: Simulation Of Drying Board. Wood Science and Technology; vol. 33, 1999; pp. 407-423.

Kliger, I. R., et al., Bending Properties Of Norway Spruce Timber. Comparison Between Fast-And Slow-Grown Stands And Influence Of Radial Position Of Sawn Timber; Annales Des Sciences Forestieres ; INRA/EDP Sciences; vol. 55, No. 3 ; 1998 ; pp. 349-358.

Johansson, C. J., Grading of Timber With Respect To Mechanical Properties; Timber Engineering; Chapter 3; 2003, pp. 23-43.

Hu, M, et al., Assessment of a Three-Dimensional Fiber Orientation Model for Timber; Wood and Fiber Science; vol. 48, No. 4, 2016, pp. 271-290.

Lukacevic, M., et al., A 3D Model For Knots and Related Fiber Deviations in Sawn Timber for Prediction of Mechanical Properties of Boards; Materials and Design, vol. 166, No. 107617, 2019, pp. 1-18.

Briggert, A., et al., Three-Dimensional Modelling of Knots and Pith Location in Norway Spruce Boards Using Tracheid-Effect Scanning; European Journal of Wood and Wood Products, vol. 74, 2016, pp. 725-739.

Kandler, G., et al., An Algorithm for the Geometric Reconstruction of Knots Within Timber Boards Based on Fibre Angle Measurements, Construction and Building Materials, vol. 124, 2016, pp. 945-960.

Perlin, L., et al., New Method to Locate the Pith Position in a Wood Cross-Section Based on Ultrasonic Measurements, Construction and Building Materials, vol. 169, 2018, pp. 733-739.

Lilly, J., et al., Generalized Morse Wavelets as a Superfamily of Analytic Wavelets, IEEE Transactions on Signal Processing, vol. 60, No. 11, Nov. 2012, pp. 6036-6041.

Lagarias, J., et al., Convergence Properties of the Nelder-Mead Simplex Method in Low Dimensions, Siam Journal on Optimization, 1998, vol. 9, No. 1, pp. 112-147.

Habite, T., et al., Automatic Detection of Pith Location Along Norway Spruce Timber Boards on the Basis of Optical Scanning, European Journal of Wood and Wood Products, 2020, vol. 78, pp. 1061-1074.

Habite, T., et al., Automatic Detection of Annual Rings and Pith Location Along Norway Spruce Timber Boards Using Conditional Adversarial Networks, Wood Science and Technology, 2021, vol. 55, No. 2, pp. 461-488.

Kiranyaz, S., et al., Real-Time Patient-Specific ECG Classification by 1D Convolutional Neural Networks, IEEE Transactions on Bio-Medical Engineering, vol. 10, No. 1109, Aug. 2015, pp. 1-13.

Olsson, A., et al., Strength Grading on the Basis of High Resolution Laser Scanning and Dynamic Excitation: A Full Scale Investigation of Performance, European Journal of Wood and Wood Products, 2017, vol. 75, pp. 17-31.

Hu, M., et al., Modelling Local Bending Stiffness Based on Fibre Orientation in Sawn Timber, European Journal of Wood and Wood Products, 2018, vol. 76, pp. 1605-1621.

Goodfellow, I., et al., Deep Learning, MIT Press, 2017, pp. 1-800.

Ruder, S., An Overview of Gradient Descent Optimization Algorithms, Insight Centre for Data Analytics, Nui Galway, Jun. 15, 2017, pp. 1-14.

Kingma, D., et al., Adam: A Method for Stochastic Optimization, ICLR 2015, Jan. 30, 2017, pp. 1-15.

Isola, P., et al., Image-to-Image Translation With Conditional Adversarial Networks, Berkley AI Research (BAIR) Laboratory, UC Berkley, Nov. 26, 2018, pp. 1-17.

Abadi, M., TensorFlow: Learning Functions at Scale, Google Brain, USA, icfp 16, Sep. 18-24, 2016, p. 1.

Sall, H., Spiral Grain in Norway Spruce, Wood Design and Technology, vol. 22, No. 2002, Vaxjo University Press, 2002, pp. 1-182.

Briggert, A., et al., Tracheid Effect Scanning and Evaluation of In-Plane and Out-of-Plane Fiber Direction in Norway Spruce Timber, Wood and Fiber Science, vol. 50, No. 4, 2018, pp. 1-19.

Van Den Oord, A., et al., WaveNet: A Generative Model for Raw Audio, Google Deepmind, London, UK, Sep. 19, 2016, pp. 1-15.

Abdeljaber, O., Real-Time Vibration-Based Structural Damage Detection Using One-Dimensional Convolutional Neural Networks, Journal of Sound and Vibration, vol. 10, No. 043, Feb. 2017, pp. 1-18.

Zhang, W., et al., A Deep Convolutional Neural Network With New Training Methods for Bearing Fault Diagnosis Under Noisy Environment and Different Working Load, Mechanical Systems and Signal Processing, vol. 100, 2018, pp. 439-453.

Soest, J., et al., A Simple Optical Scanner for Grain Defects, Fifth International Conference on Scanning Technology and Process Control for the Wood Products Industry, Atlanta GA USA, Oct. 1993, pp. 1-12.

Ronneberger, O., et al., U-Net: Convolutional Networks for Biomedical Image Segmentation, In: Navab N., et al. (Eds). Miccai 2015, Part III, 2015, pp. 234-241.

Kiranyaz, S., et al., 1D Convolutional Neural Networks and Applications: A Survey, Mechanical Systems and Signal Processing, vol. 151, 2021, 107398, pp. 1-21.

Norell, K., Creating Synthetic Log End Face Images, Image and Signal Processing and Analysis, 2009, pp. 353-358.

Bhandarkar, S.M., et al., A Computer Vision System for Lumber Production Planning, Applications of Computer Vision, Oct. 19, 1998, pp. 134-139.

Zolotarev, F., et al., Modelling Internal Knot Distribution Using External Log Features, Computers and Electronics in Agriculture, vol. 179, Oct. 12, 2020, 105795, pp. 1-11.

* cited by examiner

COMPUTER-IMPLEMENTED METHOD AND A COMPUTER SYSTEM FOR GENERATING A TRAINING DATASET FOR TRAINING AN ARTIFICIAL NEURAL NETWORK

FIELD OF THE INVENTION

The present invention relates to a computer-implemented method and a computer system for generating a training dataset for training an artificial neural network configured to detect characteristics of timber boards. In particular, the present invention relates to training of artificial neural networks configured to use one or more images of the lateral faces of the timber boards as input data and to provide information about structure and/or defects of the timber board as output data.

BACKGROUND OF THE INVENTION

It is well known that mechanical properties of sawn timber depend on both clear wood properties and occurrence of knots ([3] Kliger, I. R., Perstorper, M., & Johansson, G. (1998). *Bending properties of Norway spruce timber. Comparison between fast-and slow-grown stands and influence of radial position of sawn timber. In Annales des sciences forestières* (Vol. 55, No. 3, pp. 349-358). *EDP Sciences*; and [4] Johansson, C. J. (2003). *Timber Engineering, Chapter* 3) 1998), meaning that relationships between different properties of sawn timber are not identical to those valid for clear wood. For clear wood of softwood species, such as Norway spruce [*Picea abies* (L.) H. Karst], strong relationships exist between the distance to pith and different mechanical and physical properties. For instance, density, longitudinal modulus of elasticity (MOE), and modulus of rupture (MOR) increase significantly in radial direction from pith to bark, whereas the longitudinal shrinkage coefficient decreases in the same direction ([1] Blouin, D., Beaulieu, J., Daoust, G., & Poliquin, J. (2007). Wood quality of Norway spruce grown in plantations in Quebec, *Wood and Fiber Science,* 26(3), 342-353; [2] Ormarsson, S., Dahlblorn, O., & Petersson, H. (1999). *A numerical study of the shape stability of sawn timber subjected to moisture variation: Part 2: Simulation of drying board, Wood Science and Technology,* 33(5), 407-423). In general, the annual ring width also decreases from pith to bark, but thinning of trees in the stand may change this condition. For sawn timber, location of pith along the board determines the radial direction of knots, and direction and geometry of knots in turn determine local fibre orientation. Knowledge of pith location is then one piece of information which could be needed to establish detailed and accurate three-dimensional (3D) models of sawn timber, including geometry of knots and local fibre orientation on the basis of surface scanning, and attempts to develop such models have been made ([5] Hu, M., Olsson., A., Johansson., M., Oscarsson., J., & Serrano, E. (2016). *Assessment of a three-dimensional fiber orientation model for timber Wood and Fiber Science,* 48(4). 271-290); [6] Lukacevic, M., Kandler, G., Hu, M., Olsson, A., & Füssl, J, (2019). *A 3D model for knots and related fiber deviations in sawn timber for prediction of mechanical properties of boards, Materials & Design,* 166, 107617). Similarly, knowledge of knots or other defects positions in the board could be needed to establish detailed and accurate three-dimensional (3D) models of sawn timber. Furthermore, pith location, annual ring width and knots or defects positions affect the visual appearance of wood products, Board pieces with the pith visible on the surface are often downgraded to lower appearance classes (EN 1611-1:1999, 1999). In some cases, boards with the pith enclosed within the cross-section should be rejected (EN 1611-1:1999, 1999). Thus, in many cases knowledge of location of pith is needed for detailed modelling of local fibre direction in sawn timber ([5], [6]), and very useful for assessment of stiffness and strength ([15] Olsson, A., & Oscarsson, J. (2017), *Strength grading on the basis of high resolution laser scanning and dynamic excitation: a full scale investigation of performance. European Journal of Wood and Wood Products,* 75(1), 17-31; [16] M. Hu, A. Olsson, M. Johansson and J, Oscarsson, *Modelling local bending stiffness based on fibre orientation in sawn timber.* (2018), *European Journal of Wood and Wood Products,* 76 (6), 1605-1621) as well as for assessment of shape stability [2]. It is also important for various other purposes in the woodworking industry. Therefore, it would be of considerable practical value if industry scanners used for automated assessment of wood specimens could be used also to accurately determine structural information about the boards as well as about knots, defects and pith location along boards.

Some attempts have been made to detect the pith location of sawn timber boards ([7] Briggert, A., Olsson, A., & Oscarsson, J. (2016). *Three-dimensional modelling of knots and pith location in Norway spruce boards using tracheid-effect scanning. European Journal of Wood and Wood Products,* 74(5), 725-739; [8] Kandler, G., Lukacevic, M. and Füssl, J, 2016, *An algorithm for the geometric reconstruction of knots within timber boards based on fibre angle measurements. Construction and Building Materials,* 124, pp. 945-960; [9] Perlin, L. P., do Valle, A., & de Andrade Pinto, R. C. (2018). *New method to locate the pith position in a wood cross-section based on ultrasonic measurements. Construction and Building Materials,* 169, 733-739; [12] Habite, T, Olsson, A. & Oscarsson, J. *Automatic detection of pith location along Norway spruce timber boards on the basis of optical scanning. Eur, J. Wood Prod.* 78, 1061-1074 (2020). https://doi.org/10.1007/s00107-020-01558-1). In the work presented by Perlin et al. [8], an ultrasonic tomography measurement technique was proposed to locate the pith of a wood cross-section. The proposed method was based on the fact that acoustic waves travel faster in radial direction than in tangential direction. Thus, the method involved mounting a fixed transmitter transducer and moving the receiver transducer around the cross-section of the specimen to record several readings of ultrasonic pulse velocities (UPVs). According to [9] the pith can be located at a position where most of the highest velocity paths intersect. However, only two test specimens, a 25 cm diameter circular *Eucalyptus grandis* specimen and a 20 cm square *Aplueia leiocarpa*, were used to validate the proposed method. Additionally, the accuracy of the proposed method could be affected by the presence of internal defects within the timber cross-section [9]. Briggert et al. [7] and Kandler et al. [8] developed methods to reconstruct the 3D geometry of knots on the basis of data from surface laser scanning of Norway spruce timber boards. Both methods comprised detection of knot areas visible on the longitudinal surfaces of the board by means of tracheid effect scanning ([24] Briggert, A., Hu, M., Olsson, A., & Oscarsson, J. (2018). *Tracheid effect scanning and evaluation of in-plane and out-of-plane fibre direction in Norway spruce using. Wood and Fiber Science,* 50(4), 411-429) and utilised the detected orientation of knots to estimate the pith location along the length direction of the board. However, to be able to determine which knot surfaces (visible on different board surfaces) are parts of the same knot, knowledge of an approximate location of pith was needed already from the outset, which was obtained by examination of the end cross-sections at the board ends.

In addition to the above-mentioned studies, numerous studies have utilised images of cross-sections of logs generated from computer tomography (CT) X-ray scanning to predict the pith location of logs. Most of the studies involved (1) detection of growth rings on the cross-sectional CT images of the log slices with an assumption that the growth rings are concentric circles centred at the pith, and (2) application of Hough transform (HT) to the detected growth rings to estimate the pith location of the log slices. For a brief presentation of these research works, see [12].

Information obtained from optical scanning of timber boards has also been utilised to automatically and non-destructively estimate the pith location of knot-free clear wood sections along boards [12], The first step in the proposed method presented in [12] was to automatically identify knot-free clear wood sections along the board by considering local fibre directions on the surfaces. The then applied a continuous wavelet transform (CWT) ([10] Lilly, J. M. and Olhede, S. C., 2012. *Generalized Morse wavelets as a superfamily of analytic wavelets. IEEE Transactions on Signal Processing,* 60(11), pp. 6036-6041), with the generalised Morse wavelet method, to low-pass-filtered images of boards (pre-processed grayscale board images) to detect the annual ring width on all four longitudinal surfaces around the board. Finally, assuming that annual rings are shaped as concentric circles with the pith in the centre and with constant distance between the rings, the pith location of knot-free board sections was estimated through a simplex-based optimisation technique ([11] Lagarias, J. C., Reeds, J. A., Wright, M. H. and Wright, P E., 1998. *Convergence properties of the Welder-Mead simplex method in low dimensions. SIAM Journal on optimization,* 9(1), pp. 112-147). The proposed algorithm was tested on a sample of 104 Norway spruce boards and the median estimation error of the location of pith was less than 5 mm. In detail for a sub-sample of boards with the pith located within the cross-section, median estimation errors of 2.3 mm and 3.1 mm in the larger and smaller direction of the board cross-section, respectively, were obtained. For a larger sub-sample of boards with the pith located outside the board cross-section in most positions along the boards, slightly higher estimation errors were obtained, with a median of 2.6 mm and 3.8 mm in the respective directions. However, the accuracy of the method was limited by the assumptions that the growth rings would be concentric circles with the pith in the centre and that the distance between consecutive growth rings would be constant. Annual rings of real board cross-sections do not comply very well to these assumptions. Additionally, the filter parameters needed for the pre-processing of the input grayscale image may need frequent manual adjustment, depending on the quality and characteristics of the scanned board surfaces, which may be an obstacle for industrial applications. Regarding calculation time, the method took approximately 180 ms to determine the pith location of a single clear wood section, which is too slow considering typical industry speed requirements.

SUMMARY OF THE INVENTION

In order to improve automated assessment of timber boards, the inventor of the present application developed a computer-implemented method in which an artificial neural network is configured to use one or more images of the lateral faces of a timber board as input data and to provide information about structure of the timber board as output data, in particular information about pith location. Such a computer-implemented method is the subject of a parallel patent application in the name of this same applicant.

While developing their artificial neural network, the inventors understood that in order to make the artificial neural network operate accurately, a training dataset of at least thousands of actual boards with known characteristics (pith location in that case) is needed.

The matter is still more complicated if one considers that the training has to be done for each different kind of timber as well as for the same timber grown in different places. Each species of tree has its own characteristics as well as, the same species can grow very differently in different parts of the world.

That means that the same artificial neural network, if implemented in different timber production plants needs specific trainings focused on the kind of timber which is processed in each plant.

In practice, however, it is very difficult to obtain the necessary training dataset but the lack of the training dataset would prevent the artificial neural network developed by the inventors, as well as any other artificial neural network configured to use one or more images of the lateral faces of a timber board as input data and to provide information about structure and/or defects of the timber board as output data, to be put in practice in industrial plants.

In this context, the main technical task at the basis of the present invention is to remedy the aforementioned drawbacks.

It is in particular a task of the present invention, to develop a method for generating a training dataset for training an artificial neural network configured to use one or more images of the lateral faces of a timber board as input data and to provide information about structure and/or defects of the timber board as output data.

The stated main technical task is substantially achieved by the subject matter defined in the appended independent claims.

Particular embodiments of the present invention are defined in the corresponding dependent claims.

BRIEF DESCRIPTION OF THE DRAWINGS

Further features and advantages of the present invention will become more apparent from the detailed description of some preferred, but not exclusive, embodiments that follows and which will refer to the accompanying drawings, wherein.

DETAILED DESCRIPTION OF THE INVENTION

Figure 1:
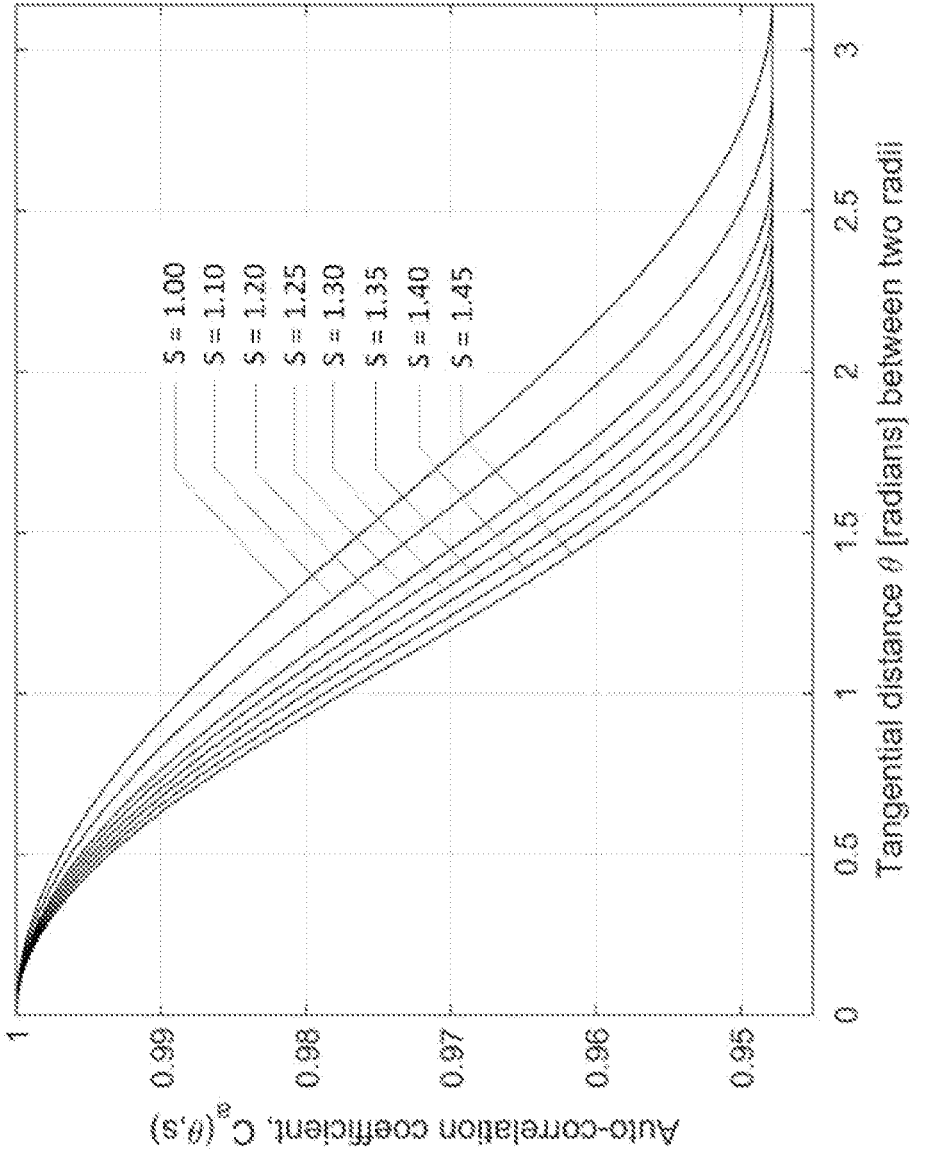
FIG. 1 represents auto-correlation functions $C_a(\theta, s)$ for different constant values of s.

The present invention relates both to a computer-implemented method for generating a training dataset for training a artificial neural network (in the following referred to as the "main artificial neural network" to distinguish it from a "secondary artificial neural network" used in some embodiments of the computer-Implemented method), configured to use one or more images of the lateral faces of a timber board as input data and to provide information about structure and/or defects of the timber board as output data, and to a computer system configured to implement the method.

The computer system comprises one or more processors and a non-transitory computer readable storage medium. The non-transitory computer readable storage medium, which is also part of the invention as such, stores one or more programs configured to be executed by the one or more processors. The one or more programs comprises instructions that, when executed by the one or more processors, cause the computer system to carry out the computer-implemented method for generating the training dataset for training a main artificial neural network, according to the invention, which is described in detail in the following.

Moreover, the present invention relates also to a computer system, comprising one or more processors and a non-transitory computer readable storage medium storing one or more programs configured to be executed by the one or more processors, where the one or more programs comprise instructions that, when executed by the one or more processors, cause the computer system to run a main artificial neural network configured to use one or more images of the lateral faces as input data and to provide information about structure and/or defects of the timber board as output data, wherein such main artificial neural network has been trained with a training dataset generated according to the present invention.

Images of the lateral faces of the boards as named above, can mean both images of the whole lateral faces and images of only parts of the lateral faces. Moreover, in the context of the present invention, images of the lateral faces of the boards are images in the visible band.

A timber board on which the present invention can be applied, develops along a longitudinal axis and comprises two end faces, transversal to the longitudinal axis, and four lateral faces developing along the longitudinal axis of the board (at least mainly parallel to it). In the greatest part of cases, the lateral faces comprise two wide lateral faces on two opposite sides, and two narrow lateral faces on the other two opposite sides. Wide lateral faces are larger that the narrow lateral faces and transversal to narrow lateral faces.

The computer implemented method of the invention includes a sequence of steps to be repeated a plurality of times; each execution of the sequence allows to generate one or more records to be added to the training dataset, where each record comprises an input-output data pair.

In the following a single execution of the sequence will be described.

The first step is a log generation step, during which a virtual model of a log is generated. In particular, the virtual model is generated comprising an internal structure and/or defects, which reproduce, respectively, an internal structure and/or defects which can be present in a real log.

The second step is a sawing step, during which the virtual model of the log is virtually sawn along virtual cutting planes. The sawing step is executed to obtain from the virtual model of the log one or more virtual timber boards, each having four virtual lateral faces developing along a longitudinal axis of the virtual timber board (the longitudinal axis of the virtual timber board corresponding to a longitudinal axis of the virtual model of the log).

Then a pattern step is run, during which a surface pattern is determined for one or more of the virtual lateral faces of a virtual timber board created in the sawing step. Advantageously, the pattern step is executed for all the virtual lateral faces of each virtual board. The surface pattern is determined as the pattern resulting from the intersection between the surface of the virtual lateral face, and the internal structure and/or defects of the virtual model of the log.

Once one or more surface patterns have been determined, the computer-implemented method comprises a rendering step, during which each surface pattern generated in the pattern step is used to create a rendered surface image of the corresponding lateral face of the virtual timber board. Depending on the embodiment, different kind of rendered surface images can be created.

In some embodiments, rendered surface images are created as photorealistic surface images, i.e. virtual photographs of the surfaces of the virtual lateral faces lightened with non structured visible light.

In some embodiments, rendered surface images are creates as non-photorealistic surface images representing information corresponding to those which can be acquired by an optical scanner framing the surfaces of the virtual lateral faces lightened with a structured light constituted by laser dots.

In some embodiments, rendered surface images are creates as non-photorealistic surface images representing information corresponding to those which can be acquired by an optical scanner framing the surfaces of the virtual lateral faces lightened with a structured light constituted laser lines.

In some embodiments, rendered surface images can however be created as other kinds of non-photorealistic surface images, representing information corresponding to what can be acquired using an optical scanner framing the surfaces of the virtual lateral faces under different lightening conditions.

The method then comprises an input data generation step, during which the rendered surface images are used to create one or more item of input data for the training of the main artificial neural network.

Once the one or more virtual boards have been generated, the method also comprises an output data generation step which can be executed independently from/in parallel to the other step disclosed above. During the output data generation step, an item of output data is generated for each virtual timber board on the basis of the internal structure and/or defects of the virtual model of the log. As described in the Example below, the item of output data can be constituted by the position of the pith of the virtual model of the log with respect to the cross-section of the virtual timber board. In other exemplary embodiments, the item of output data can be constituted by at least one from: the position and/or the extension of heartwood, the position and/or the extension of sapwood, the position and/or the extension of bark, the position of annual rings, the presence, the position and/or the extension of spiral grain.

After both the input data generation step and the output data generation step have been terminated, the method finally comprises a population step, during which, for each item of input data generated in the input data generation step, a record is added to the training dataset. As indicated above, each record comprises an input-output data pair which comprises the item of input data, in combination with the item of output data, which has been generated in the output data generation step for the virtual timber board which the item of input data refers to.

Each of the above listed steps will now be described in more detail.

As regards the log generation step, in the preferred embodiment it comprises the following steps: a basic cross-section generation step, an axial development step and a combination step.

During the basic cross-section generation step a basic cross-section is generated for the virtual model of the log. According to the present disclosure, the basic cross-section is a cross-section which is then used to generate all other cross-sections of the virtual model of the log. The basic cross-section can be positioned at any position along the longitudinal axis of the virtual model of the log. In the preferred embodiment, however, the basic cross-section is made to coincide with the largest end face of the log, that is with the part of the log which was positioned at the lowest quote in the tree (the root end). As known, in fact, the cross-section of a log decreases moving from the base to tip of the tree.

In a preferred embodiment, the basic cross-section generation step is split into two subsequent steps.

First there is a contour definition step, during which a pith position is defined, and an external contour of the basic cross-section is generated with reference to the pith position. After, a ring generation step is executed, during which annual growth rings are defined in between the pith position and the external contour.

In greater detail, in the preferred embodiments, the basic cross-section generation step is based on a stochastic model developed to simulate real logs.

As in the Example described below, according to an advantageous approach; the stochastic model can be based on the assumption that the lengths of two different radial segments extending from the pith location to two distinct points of the external contour (which in a real log would correspond to lines drawn from pith to bark at a cross-section perpendicular to the longitudinal axis, lines that in the following are also referred to as "radii"), correlate such that a correlation coefficient between the two radial segments is an auto-correlation function of the angle that the two segments form between them.

In the stochastic model, it was assumed that the auto-correlation function, $C_a$, of the angle between the two radial segments is defined as $$C_a\left(0 \le \theta \le \frac{\pi}{s}\right) = \cos(\theta s)\frac{(1-c_0)}{2} + \frac{(1+c_0)}{2} \qquad \text{(1a)}$$

$$C_a\left(\theta > \frac{\pi}{s}\right) = c_0 \qquad \text{(1b)}$$

where:
  $c_0$ is a correlation coefficient between the distance from pith to bark on the north and south sides of the real trees of the involved species;
  $\theta$ is the (smallest) angle between the two radial segments; and
  $s$ is a factor equal to or larger than one.

Thus, any chosen value of s defines an auto-correlation function for the distance from pith to bark such that the smaller the angle between two radial segments, the higher the correlation between the radial segments.

Using the function $C_a(\theta, s=1.00)$ when generating the external contour of virtual log basic cross-sections tends to produce rather circular or ellipsoidal external contours, whereas higher values of s, e.g. s=1.45, tends to generate external contours that are more distorted in shape.

Once defined the correlation function, the tangential direction around the basic cross-section (range; 0:2π) has to be discretised in n segments, such that n tangential segments and corresponding radial segment lengths are used to represent the basic cross-section in the model. The angle between two adjacent radial segments is thus 2π/n.

In a preferred approach n must be greater than 50, preferably greater than 80. In general, the larger the size of the basic cross-section, the higher the value of n. In many embodiments, n=100 is a good choice.

The target correlation between any two radial segments of a log cross-section is given by $C_a(\theta, s)$ and stored in a correlation matrix C (size n×n). Furthermore, it is assumed that said radial segment of the basic cross-section is a Gaussian variable and principal component analysis was employed to generate sets of radial segments to represent basic cross-sections by factorising C as $$D = V^T C V \qquad \text{(2)}$$

where D is the diagonal elgenvalue matrix of C, and V is the corresponding orthogonal eigenvector matrix. The eigenvalues in D (any imaginary parts ignored) represent variances of a transformed set of independent Gaussian variables, such that sets of n correlated radial segments, for m virtual basic cross-sections, are established as $$\overline{R} = \left(\overline{P} D^{\frac{1}{2}} V\right)\sigma + \mu \qquad \text{(3)}$$

where $\overline{P}$ is a matrix (m×n) of independent random numbers N(0, 1), and μ and σ are the target mean and standard deviation of the log cross-section radial segments (values to be used depend on the specific case). Thus, each line in $\overline{R}$ (size m×n) contains a set of correlated radial segments for one basic cross-section of a virtual model of a log, Since the radial segments are strongly correlated, most of the eigenvalues of D are very close to zero and thus insignificant. Therefore, in practice, it is sufficient to consider the r largest eigen values in D, where r<<n, and the corresponding eigenvectors in V. This means that the size of matrices actually used in Formula 3 are: $\overline{P}$ (m×r), D (r×r) and V (n×r).

As explained, then, each line in R is a generated set of n correlated radial segments for one basic cross-section of a virtual model of a log.

Once the external contour has been established, the ring generation step is executed to fit annual growth rings inside it.

In a preferred embodiment, that is done by shaping annual rings according to the external contour and by applying a distance between subsequent rings corresponding to a measured ring profile of annual growth rings of a real log.

To do that, the average length of radial segments of each generated virtual log cross-section can be compared with the length of radial segment (in the north direction) of measured real log cross-sections.

In one embodiment, the real log cross-section with radius most similar to the average length of radial segments of the virtual model of the log, is selected and the annual ring profile of this real log (from pith to bark in direction north along the radius) is applied to the basic cross-section of the virtual model of the log. This can be done such that all the annual rings, when mapped on the virtual model basic cross-section, get the same shape as the external contour of the virtual model basic cross-section and almost the same distances between annual rings as in the real log cross-section from which the annual ring profile has been taken.

In some embodiments, the log generation step further comprises at least one of the following additional steps:

a heartwood and/or sapwood generation step, during which virtual heartwood and/or virtual sapwood are inserted in the virtual model of the log;

a bark generation step, during which a virtual bark is inserted in the virtual model of the log;

a grain insertion step, during which a virtual grain direction is applied to the virtual model of the log.

Preferably, those additional steps are first executed during the basic cross-section generation step, in addition or not to the ring generation step.

Once the basic cross-section has been defined, the axial development step can take place to propagate the structure along the longitudinal axis. In particular, during the axial development step, the basic cross-section is used to generated additional cross-sections of the virtual model of the log in different positions along the longitudinal axis, preferably along the whole longitudinal axis.

In some embodiments, the generation of an additional cross-section, at a given distance from the basic cross-section along the longitudinal axis of the virtual model of the log, comprises a tapering step during which the basic cross-section is reduced as a function of the given distance.

In the preferred embodiments, it is simply assumed that the "diameter" of virtual model of logs decreases in direction from the root end to the top end, with a factor of 1/f times the longitudinal distance from the starting point (usually the root end), where f can be determined on the basis of characteristics of real logs of the involved species; usually f can vary between 40 and 120, mainly between 60 and 100. The size of each annual ring thus decreases with increasing distance from the basic cross-section. Consequently, some annual rings of additional cross-sections get negative size at large longitudinal coordinates but rings with negative size are eliminated such that the number of annual rings of real cross-sections decreases with increasing longitudinal coordinate along the longitudinal axis, i.e. additional cross-sections closer to the top end contain fewer annual rings, just as for real logs. Since removing annual rings is easier than adding some, the choice of the root cross-section as the basic cross-section is the best one for the present invention.

Since real logs further to taper, can also crook and twist during their growth, in the preferred embodiments the generation of the additional cross-section at the given distance along the longitudinal axis of the virtual model of the log, can further comprise at least one of a crooking step and a twisting step. During the crooking step the pith location of the additional cross-section is displaced in a plane perpendicular to the longitudinal axis passing through the pith location at the basic cross-section, while during the twisting step the additional cross-section is rotated around its pith location.

Crook is advantageously applied to the additional cross-section using a model with 3p stochastic parameters (p=8 is a preferred value). The displacements in x- and y-direction, respectively, of the cross section, $D_x(z)$ and $D_y(z)$, are stochastic functions of the longitudinal coordinate, z (the origin of the coordinate system placed at the pith in the basic cross-section of the virtual model of the log) and determined as $$D_x(z) = \sum_{i=1}^{p} \sin(\theta_i) a_i \sin\left[\frac{2\pi(z + z_{0,i})}{L_i}\right] \tag{4a}$$

and $$D_y(z) = \sum_{i=1}^{p} \cos(\theta_i) a_i \sin\left[\frac{2\pi(z + z_{0,i})}{L_i}\right] \tag{4b}$$

where $L_i = 2^{(5-i)} \cdot 1000$ [mm] is a deterministic wavelength of a sinusoidal function, $a_i$ is the corresponding stochastic amplitude: $a_i \sim U(0, a_{max,i})$ where $a_{max,i} = L_i/320$, $z_{0,i}$ is a stochastic shift in longitudinal direction: $z_{0,i} \sim U(0, z_{0,max})$ (where $z_{0,max} = 4000$ mm can be a typical value), and $\theta_i$ is a random angle [radians]: $\theta_i \sim U(0, 2\pi)$. Thus, the location of pith along the longitudinal coordinate, z, of the additional cross-sections can be determined by random realisations of $D_x(z)$ and $D_y(z)$, as defined in Formulas (4a) and (4b).

A similar model can be applied to take into account also twist in the twisting step.

Once the basic cross-section and the additional cross-sections have been defined, during the combination step the basic cross-section is combined with the additional cross-section to create the whole virtual model of the log. Interpolation can be used to fill any gap between two adjacent cross-sections.

In some embodiments, the log generation step can further comprise a defect insertion step, during which one or more defects are introduced in the virtual model of the log generated in the combination step which can comprise, or not, the annual growth rings).

In some embodiments, the defect insertion step comprises one or more occurrences of a node insertion step, During each occurrence of the node insertion step, a node is inserted in the virtual model of the log, at a node position along the longitudinal axis. The node is generated extending outwards from the longitudinal axis; it can extend up to the external surface of the virtual model (that is to the bark to simulate a live knot) or can stop inside the virtual model to simulate a dead knot.

In some embodiments, the defect insertion step comprises one or more occurrences of an inclusion insertion step; during which a defective volume is included in the virtual model of the log. The defective volume can represent any undesired inclusion in the log, as a pocket of resin, a blue stain, a brown stain, a compression wood, a bark enclosure, etcetera.

In some embodiments, the defect insertion step comprises one or more occurrences of a deformation insertion step, during which cross-sections along a limited portion of the longitudinal axis of the virtual model of the log, are deformed.

In some embodiments, the defect insertion step comprises one or more occurrences of a missing part insertion step, during which at least one of a heavy rot, a generic hole, an insect hole, a crack, a shake or a split is inserted in the virtual model of the log.

The defect insertion step can also be based on a stochastic model developed on the basis of data relating to relevant real logs.

After the log generation step has been completed, the sawing step can take place. From the generated virtual model of log, one or more virtual timber boards of dimensions $B_b$ (smaller board dimension)$\times H_b$ (larger board dimension)$\times L_b$ (board length) can be virtually sawn.

In some embodiments, the sawing step is executed by applying a predefined cutting scheme to the virtual model of the log and/or by randomly positioning virtual cutting planes in the virtual model of the log.

In some embodiments where the pith position or the annual growth rings scheme is relevant, a domain can be defined with respect to the pith in the basic cross-section (preferably at the root end of the virtual model of the log), within which the virtual timber board cross sections are randomly placed, as discussed, for example, in the Example which follows.

As already said, after the sawing step the pattern step takes place. Advantageously, during this step a surface image is created representing the internal structure and/or defects of the virtual model of the log at the lateral face of the virtual timber board. The surface image represents the pattern resulting from the intersection between the surface of the virtual lateral face and the internal structure and/or defects of the virtual model of the log.

Due to the modelled taper, crook and twist of the log, the virtual board cross-sections get different annual ring patterns for cross sections at different longitudinal coordinates.

Board surface images can be represented as binary images, where the black lines/pixels are represented by ones (1), and represent annual rings or defect as knots, and the white background by zeros (0) and represent clear wood. Other kinds of images (i.e. greyscale ones) can be used to distinguish more features (i.e. clear wood, annual rings, nodes, splits, holes, . . . ).

If surface images are produced in the pattern step, in the preferred embodiments during the rendering step a trained secondary artificial neural network is used to translate each surface image into a rendered surface image. A preferred example of secondary artificial neural network is described in the Example, where the rendered surface images are photorealistic surface images.

In some embodiments, the secondary artificial neural network is trained to operate on images of a predetermined dimension.

In this case, if surface images are larger than the predetermined dimension, each surface image is partitioned into a plurality of working images with the predetermined dimension. Each working image is then inputted into the trained secondary artificial neural network which translates the working image into the rendered working image.

So obtained rendered working images are finally combined together according to the original partitioning of the surface image (such that rendered working images assume reciprocal positions identical to those of the working images they originate from) to create the rendered surface image of the lateral face of the virtual timber board.

Moving to the input data generation step, during it one item of input data is created. However, depending on the main artificial neural network to be trained with the input data, different options are possible as regards the input data generation.

In some embodiments, the item of input data corresponds to a single whole rendered surface image.

In some embodiments, the item of input data corresponds to a set of two or three rendered surface images of lateral faces of the same virtual timber board.

In some embodiments, the item of input data corresponds to a set of all rendered surface images of the four lateral faces of the same virtual timber board.

In some embodiments, the item of input data corresponds to a portion of a single rendered surface image.

In some embodiments, the item of input data corresponds to a set of two or three portions of distinct rendered surface images of lateral faces (one portion for each lateral face) of the same virtual timber board. In this case the different portions correspond to parts of the respective lateral faces which are positioned at a same position along the longitudinal axis.

In some embodiments, the item of input data corresponds to a set of portions of distinct rendered surface images of all four lateral faces of the same virtual timber board. Also in this case, the different portions correspond to parts of the lateral faces positioned at a same position along the longitudinal axis.

Depending on the embodiments, furthermore, when portions of rendered surface images are involved, each of said portions can be either a bidimensional or a one-dimensional image.

In a preferred embodiment, the item of input data corresponds to a set of four one-dimensional images, each belonging to a distinct rendered surface image, and which globally define a contour of the virtual timber board in a plane perpendicular to the longitudinal axis.

Finally, as regards the output data generation step, according to the present invention the item of output data can be constituted by any feature which can be calculated or determined on the basis of the virtual model of the log and the corresponding virtual timber board.

In particular, the item of output data can be any piece of information which is relevant in wood assessment, i.e. the pith position, the knot-clear wood ratio, ecc . . . . . An implementation example of the present invention will be described here below.

EXAMPLE

The present Example has been refined in the context of developing a deep learning-based method to automatically determine the pith location along Norway spruce timber boards. The deep learning-based method was based on grayscale images of longitudinal board surfaces obtained from industrial optical scanning. The algorithm of the deep learning-based method was based on a trained one-dimensional convolutional neural network (1D CNN), utilising data of the raw grayscale images of the four sides of a board, to automatically determine pith location along the board at clear wood sections. At each assessed clear wood section, the light intensity of a single pixel line across the four sides was used as an input to the 1D CNN.

The training of the 1D CNN had to be carried out using a dataset composed of normalised and resembled input light intensity signals of the four sides of boards together with their corresponding x- and y-coordinates of pith location. In practice it was, however, very difficult to obtain a training dataset of thousands of actual boards with known pith location. Therefore, the computer-implemented method of the present invention has been applied in order to generate a training dataset on the basis of virtual timber boards with artificial grayscale rendered surface images and known pith location. According to the above general disclosure, the first step in this development has been to establish a stochastic model of log geometry and annual growth rings (the latter represented by discrete borders between latewood and earlywood) for Norway spruce, by which virtual models of logs could be generated.

In the second step, timber boards have been virtually sawn from such generated virtual models of logs, resulting in virtual timber boards in which, in the next step, discrete surface growth ring patterns have been identified. In the next step, these patterns of the virtual timber boards have been translated into RGB rendered surface images which resembled surfaces of actual Norway spruce timber boards.

A detailed description of the used procedure to generate rendered virtual timber boards with known pith location is presented below.

Generation of Virtual Models of Logs

The shape and annual ring width of real logs (of Norway spruce as well as of any other tree species) depend on the climate, on genetics of the tree, on the presence of other trees in its close surroundings, on damage due to various external causes, etcetera. Thus, real trees are not shaped as cylinders and the distances between annular rings are not constant. Generally, trees taper in upward direction, and they are more or less crooked. Also, the cross-section of a tree or log can deviate substantially from a circular shape. Annual rings tend to be thicker close to pith and thinner at larger distance from pith, i.e. closer to the bark in an old tree. Thus, to generate virtual timber boards with realistic annual ring patterns, a stochastic model to generate realistic virtual models of logs had to be developed first.

The data collected by Säll ([23] "Säll, H., 2002. Spiral grain in Norway spruce (Doctoral dissertation, Växjö University Press") of annual ring distances of 390 discs, cut from the top end of 390 Norway spruce logs, has been used as basis for the stochastic virtual log model. The sample of logs was composed to represent a variety of annual growth rate, size of trees, height in the tree and silviculture treatments. Since annual ring widths were determined from bark to bark, through the pith, the collected data give knowledge not only of radial distance between annual rings but also some basis for a statistical model of the shape of log cross-sections.

The log disc diameters ranged from 92 to 490 mm, with a mean (p) of 232 mm and a standard deviation ($\sigma$) of 75 mm. Regarding shape of log cross-sections, the distance from pith to bark on the north and south sides of the trees, respectively, correlated with a correlation coefficient $c_0$=0.948.

In the stochastic model to generate virtual log cross-sections, it was assumed that the length of two different radial segments in the cross-section, i.e. lines drawn from the pith to bark, correlate such that the correlation coefficient between the two segments is the auto-correlation function. $C_a$ of Formulas (1a) and (1b).

In FIG. 1 auto-correlation functions $C_a(\theta, s)$ as defined in Formulas (1a) and (ab) are drawn for s=1.10, 1.20, 1.25, 1.30, 1.35, 1.40 and 1.45, respectively. Herein s=1.00 was used to generate 30% of the sample of virtual log cross-sections, and 10% of the sample was generated using each of the following values for s; 1.10, 1.20, 1.25, 1.30, 1.35, 1.40 and 1.45.

The tangential direction around the log cross-section (range; 0:2$\pi$) was discretised in n segments with n=100, such that 100 tangential segments (the angle between two adjacent segments is thus $\pi/50$) were used to represent log cross-sections in the model. The target correlation between any two radial segments of a log cross-section is given by $C_a$ ($\theta$, s) and stored in a correlation matrix C (size 100×100). Furthermore, it was assumed that a radius of a log cross-section is a Gaussian variable and principal component analysis was employed to generate sets of radial segments to represent virtual log cross-sections by factorising C according to Formula (2) above. Then Formula (3) was applied by setting $\mu$=232 mm and $\sigma$=75 mm, obtaining matrix $\overline{R}$ (size m×n), each line of which contained a set of correlated radial segments for one virtual log cross-section.

Figure 2:
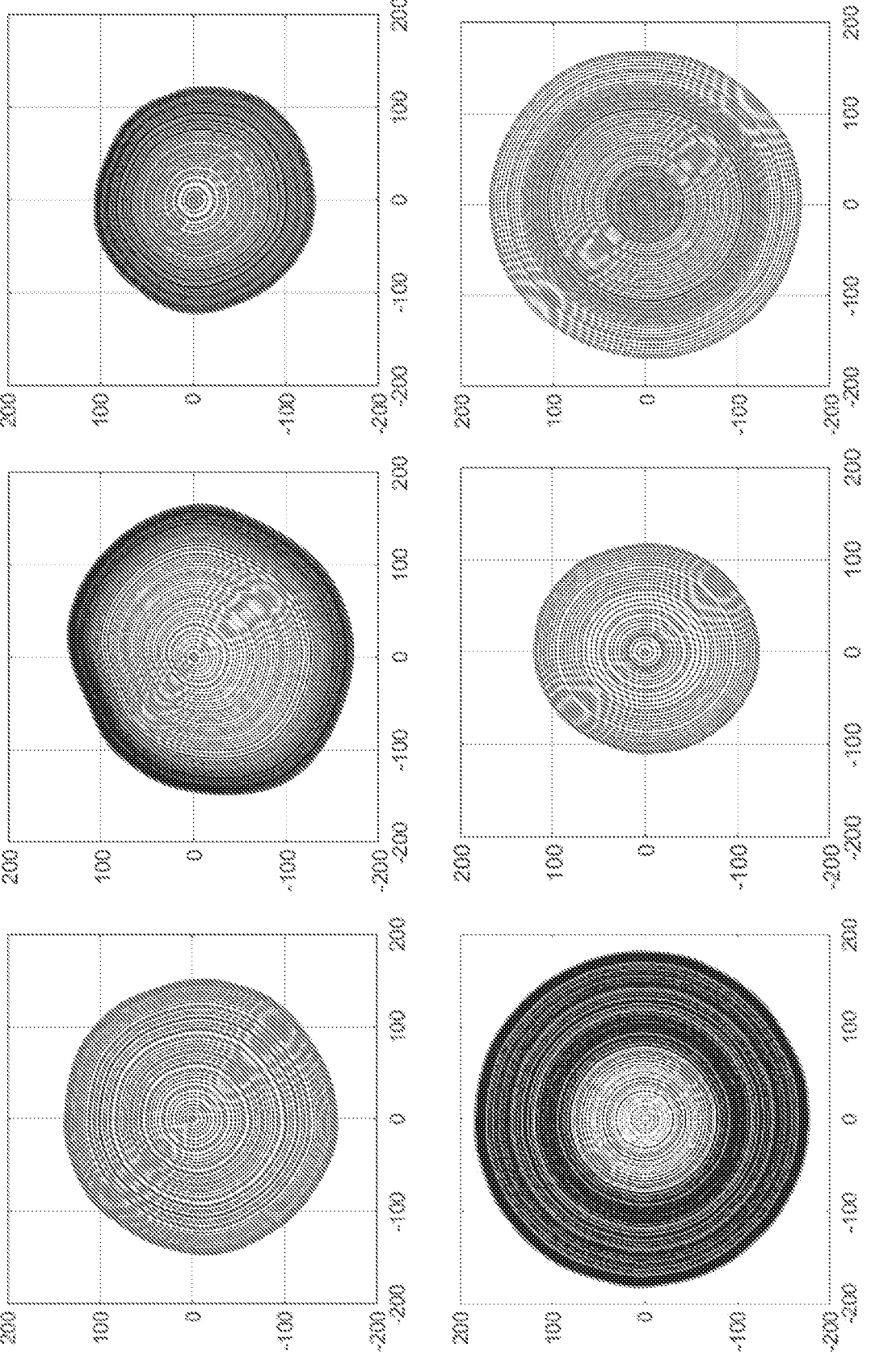
FIG. 2 represents examples of generated virtual log cross-sections.

The next step was to assign, to each virtual log cross-section, an annual ring profile. This was done such that the average radius of each generated virtual log cross-section was compared with the radii (north direction) of the 390 real log cross-sections measured by Säll ([23]). The real log cross-section with radius most similar to the average radius of the basic cross-section of the virtual model of the log was selected and the annual ring profile of this real log (from pith to bark in direction north) was applied to the virtual log. This was done such that all the annual rings, when mapped on the virtual log cross-section, get the same shape as the external contour of the virtual model basic cross-section and almost the same distances between annual rings as in the real log cross-section from which the annual ring profile was taken. FIG. 2 shows six examples of generated virtual log cross-sections. The generated virtual log cross-sections were considered valid for the root end (the end of the log closest to the root of the tree) of virtual models of logs. To model a virtual log, taper and crook were considered next. Regarding taper, it was simply assumed that the diameter of virtual models of logs decreases in direction from the root end to the top end with a factor of $\frac{1}{80}$ times the longitudinal distance from the root end. The radial segments of each annual ring thus decrease with increasing distance from the root end. Consequently, some annual rings of a modelled log get negative length at large longitudinal coordinates, but rings with negative length have been eliminated such that the number of annual rings of cross-sections decreases with increasing longitudinal coordinate, i.e. log cross-sections closer to the top end contain fewer annual rings, just as for real logs.

Crook was applied to the virtual models of logs using a model with 3p stochastic parameters, where p=8 was used. The horizontal displacements in x- and y-direction, respectively, of the cross-section, $D_x(z)$ and $D_y(z)$, were determined using Formulas (4a) and (4b) above (with $z_{0,max}$=4000 mm). Thus, the location of pith along the longitudinal/vertical coordinate, z, of the log were determined by random realisations of $D_x(z)$ and $D_y(z)$, as defined in Formulas (4a) and (4b).

Figure 3:
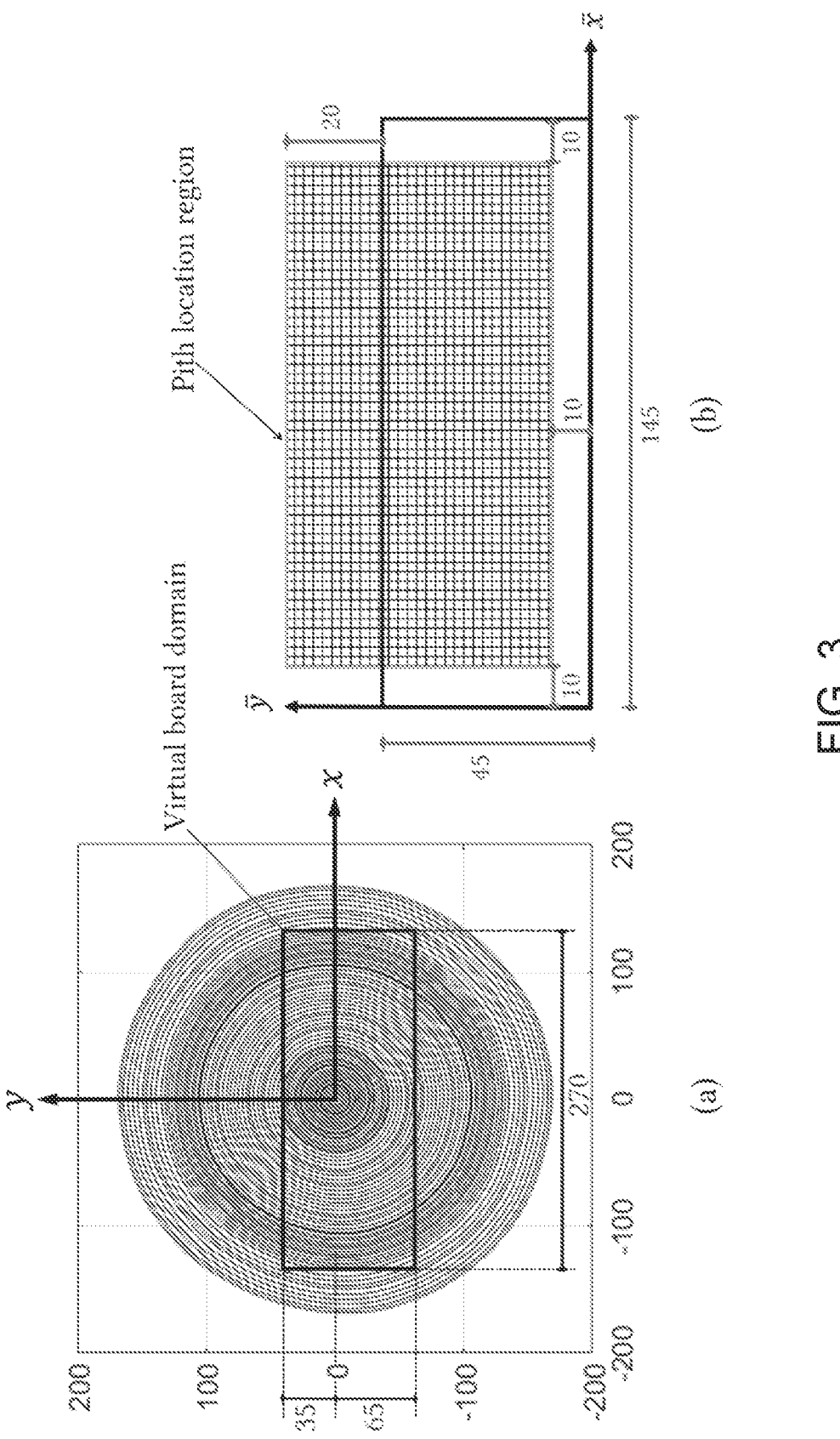
FIG. 3 represents: (a) a generated log cross-section on which a virtual board domain, within which a virtual board cross-section is placed, is marked by a rectangle and (b) a board cross-section, marked by solid black lines, and the pith location region, marked by a grid (corresponding to the virtual board domain shown in (a)) within which the pith can be located.

Generation of Virtual Timber Boards with Discrete Annual Ring Patterns on Surfaces As said above, from the generated virtual models of logs, virtual timber boards of dimensions $B_b$ (smaller board dimension)×$H_b$ (larger board dimension)×$L_b$ (board length) can be virtually sawn. In the current example, a total of 3000 virtual timber boards of dimensions 45×145×205 mm were virtually sawn from 3000 generated logs. A domain was defined with respect to the pith in the root end of the log cross-sections (that is at the basic cross-section), within which the virtual board cross-sections were randomly placed. FIG. 3 (a) shows such a domain (from here on referred to as the virtual board domain) of size 100×270 mm (this size was adopted throughout the Example) indicated by a rectangle drawn on top of a virtual log cross-section. It must be noted that the virtual board domain is placed eccentrically with respect to the pith of the log cross-section and ranges, in vertical direction, from −65 to +35 mm. This eccentricity of the virtual board domain was adopted throughout the Example. Furthermore, FIG. 3 (b) shows a region, highlighted by a grid, drawn on top of a 45×145 mm virtual board cross-section, together with a Cartesian coordinate system y) with origin placed at the lower left corner of the board cross-section. For a board cross-section of size 45×145 mm (which is the only size considered herein) placed within the adopted virtual board domain the pith must, by necessity, be located within the highlighted region, which from here on is referred to as the pith location region. As can be seen in FIG. 3, a 100×270 mm virtual board domain corresponds, for a board cross-section of size 45×145 mm, to a 55×125 mm pith location region. Thus, the positioning of the board cross-section within the log cross-section is determined by two random variables, $\Delta_x$~U(10, 135) [mm] and $\Delta_y$~U(10,65) [mm], defining the distances between the lower left corner of the board cross-section and the pith of the log cross-section in the root end such that $$\bar{x} = x + \Delta_x \tag{5a}$$

$$\bar{y} = y + \Delta_y \tag{5b}$$

$$\bar{z} = z \tag{5c}$$

The geometrical relationships between virtual models of logs and virtual timber boards sawn from the virtual models of logs were now defined.

Figure 4A:
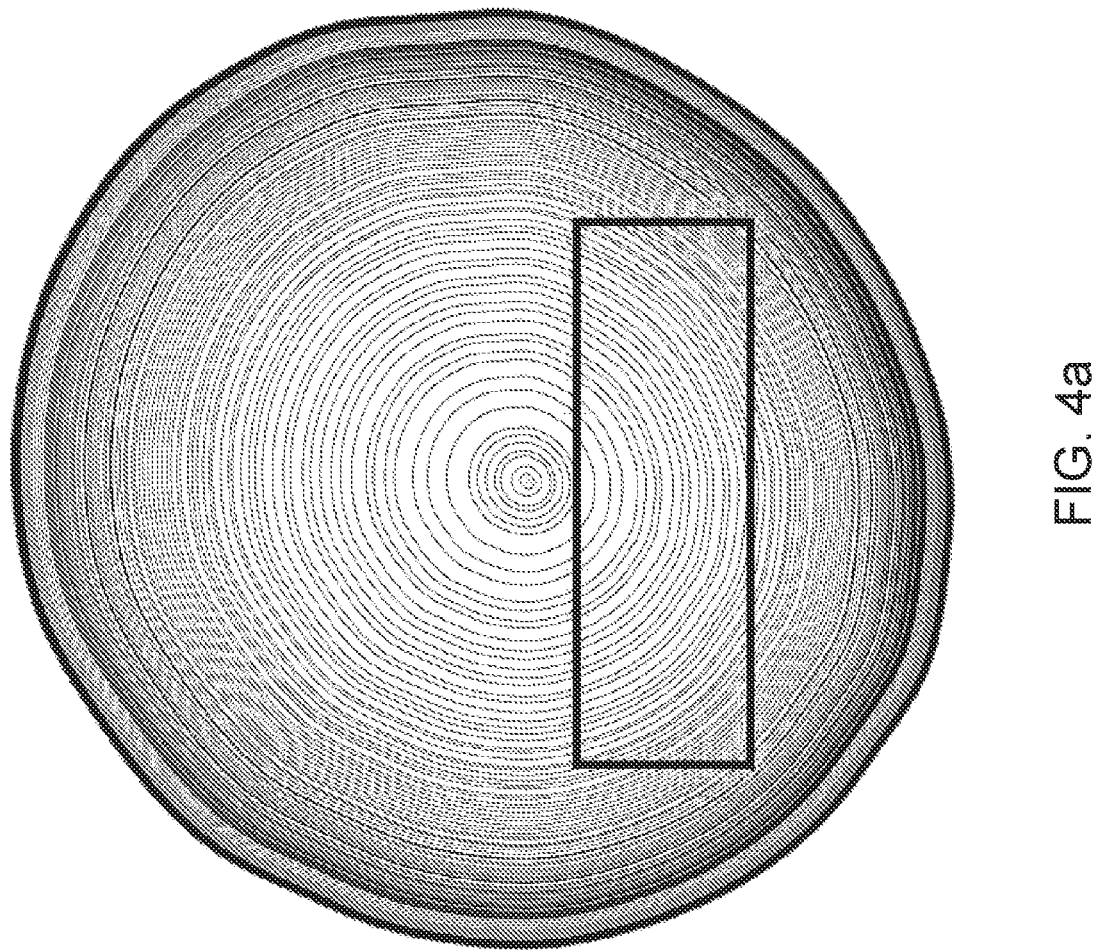
FIG. 4 shows example of a generated virtual model of a log and a virtual timber board (size 45×145×205 mm): (a) log and board cross-section; (b) binary images of the four surfaces of the board with calculated/virtual annual ring pattern displayed on the surfaces.
Figure 4B:
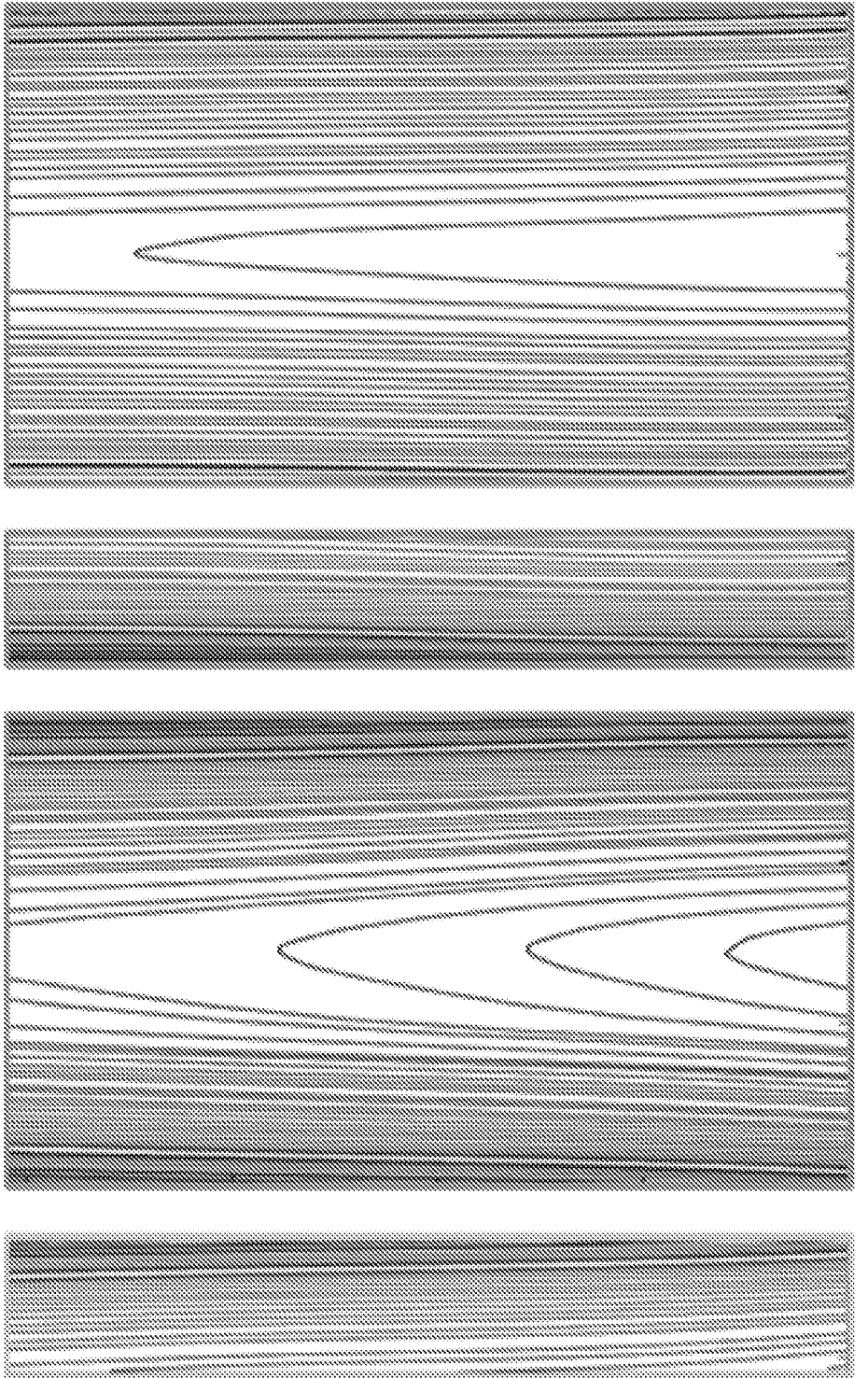

Virtual sawing of boards from logs resulted in distinct growth ring patterns on all the virtual board surfaces, determined by calculating the lines of intersection between annual rings of the log and the surfaces of the board. FIG. 4a shows a root end log cross-section (the basic cross-section) of a generated virtual model of a log and a virtual timber board cross-section drawn on top of it. FIG. 4b shows images of the four surfaces of the corresponding virtual timber board (length 205 mm) with the calculated/virtual annual ring patterns displayed on the surfaces. Note that due to the modelled crook and taper of the log, the virtual board cross-section gets different annual ring patterns for cross-sections at different z(longitudinal)-coordinates. Board surface images such as the one shown in FIG. 4b could be represented as binary images, where the black lines/pixels are represented by ones (1), i.e. the annual rings, and the white background by zeros (0).

Generation of Virtual Timber Boards with Rendered Surfaces

When the binary images, which represents the surface growth ring pattern of the virtual timber boards, had been obtained, see FIG. 4b, the next step was to translate such surface images of the sawn virtual timber boards to rendered RGB surface images resembling surfaces of actual Norway spruce timber boards.

For this purpose, a conditional generative adversarial network (cGAN), as proposed in Isola ([20] "Isola, P., Zhu, J. Y, Zhou, T, & Efros, A. A. (2017). *Image-to-image translation with conditional adversarial networks. In Proceedings of the IEEE conference on computer vision and pattern recognition* (pp. 1125-1134)"), was employed. Conditional GANs are image-to-image translating tools consisting of two CNNs (convolutional neural networks), the generator and the discriminator. The generator is tasked to take the input image and translates it into an output image. The discriminator, on the other hand, takes the generated output image together with the input image and assesses whether the output image is analogous to the "true" target image, which belongs in the training dataset, or "fake" output image generated by the generator. Both CNNs are trained simultaneously over a dataset of input-target pairs, in which the generator is trained to "trick" the discriminator by producing output images that are indistinguishable from target images. Whereas the discriminator is trained to become better at distinguishing between output/fake images generated by the generator and target image. For a brief introduction on the cGAN, see Habite ([13] "Habite, T, Abdeljaber O. & Olsson, A. Automatic detection of annual rings and pith location along Norway spruce timber boards using conditional adversarial networks. Wood Sci Technol 55, 461-488 (2021). https://doi.org/10.1007/s00226-021-01266-w"). In the present Example, a cGAN model called "pix2pix" [20] was trained to translate a 256×256 pixels binary images of the virtually sawn boards, such as the one shown in FIG. 4b, to rendered RGB images of the same resolution. The choice of the pix2pix model was motivated by its success in challenging image-to-image translation problems ([20]) including translating RGB board images to binary images representing the growth rings visible on board surface as presented in ([13]). Accordingly, the training dataset for such a network was generated by following a similar input-output structure with a resolution of 256×256 pixels. Seven Norway spruce boards with nominal dimensions of 45×145×4500 mm, originating from the areas around the lake Siljan in mid-Sweden and Hamina in south Finland, were used to generate the input-target training datasets required for the cGAN training. The target/output part of the dataset were obtained by sliding a 256×256 pixels window over the RGB images of the two wider sides of the seven boards with an overlap of 200 pixels, where the RGB images had a pixel size of 0.8 mm and 0.07 mm in lengthwise and crosswise board direction, respectively. The corresponding input part of the training dataset were produced by manually tracing the surface growth rings visible on the two wider sides of the boards to create binary images corresponding to the surface annual ring pattern on the RGB images of the seven boards. The resulting binary images were then sliced into 256×256 pixels binary images to match the output/target RGB images produced from the scanning data.

Figure 5:
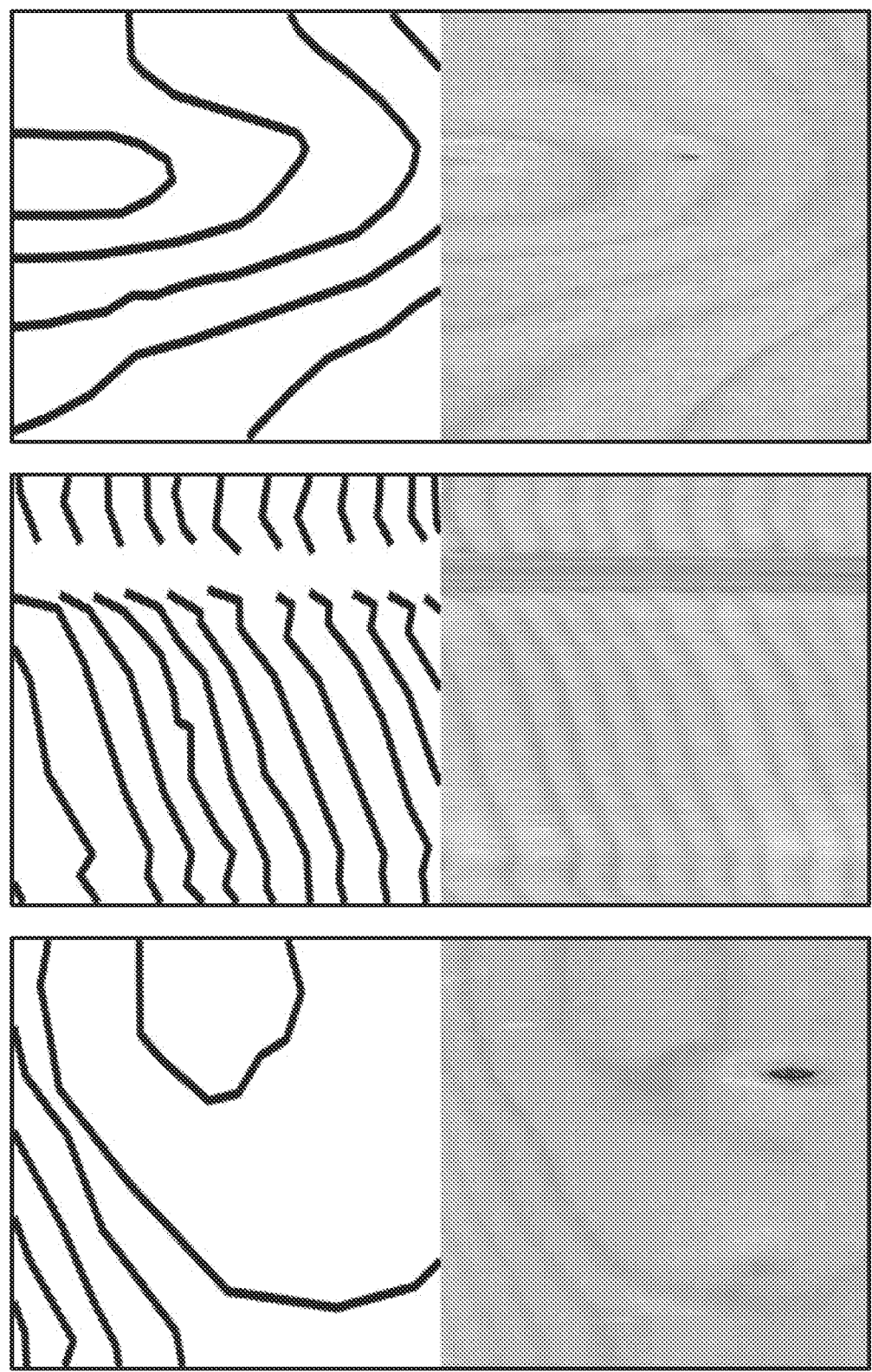
FIGS. 5, 6 and 7 represent examples of 256×256 pixels input-target pairs of a training dataset.
Figure 6:
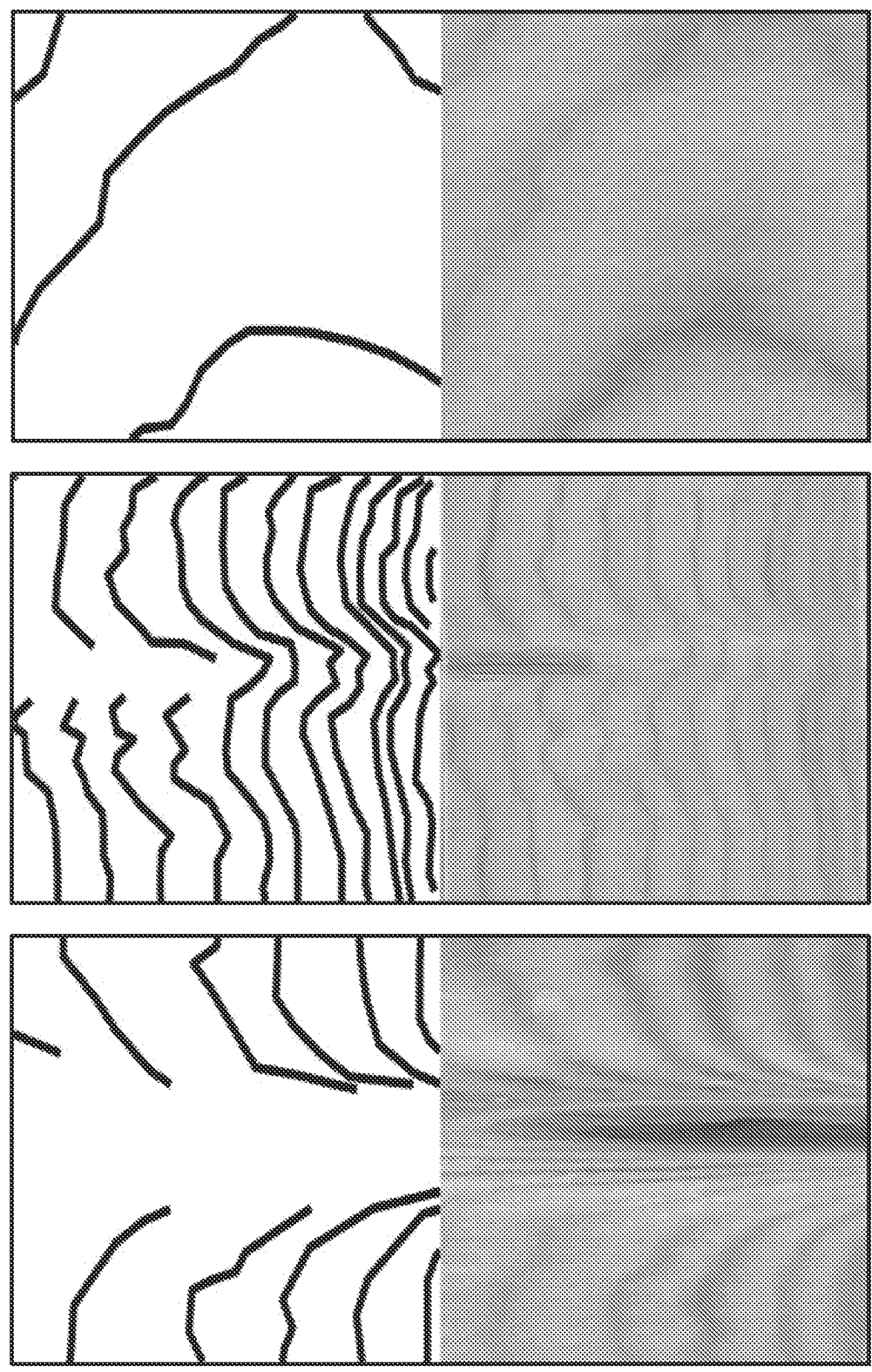
Figure 7:
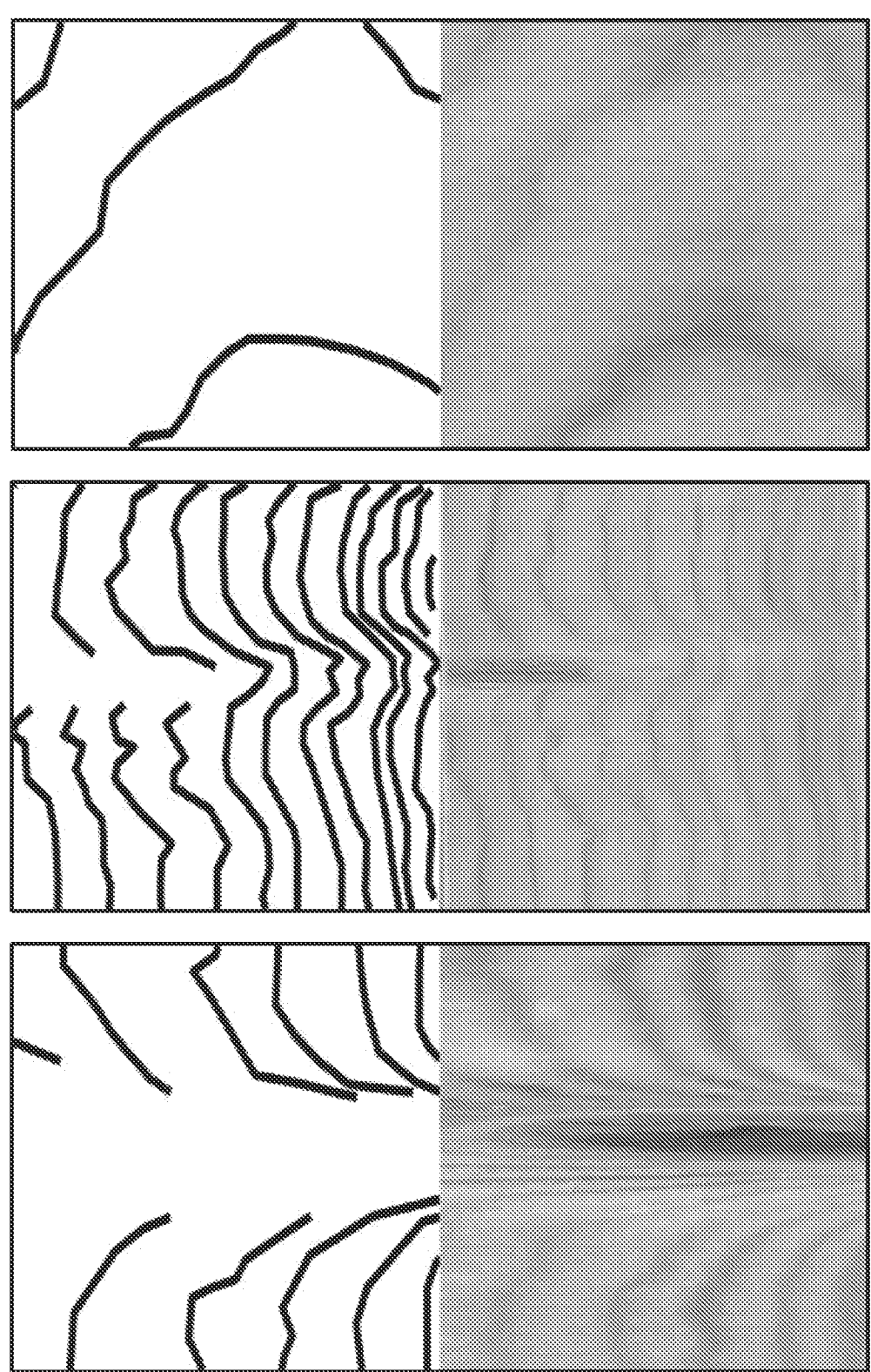

Following the described procedure, a total number of 3,327 256×256 pixels input/output pairs of RGB images were generated and shuffled randomly to constitute a training dataset. FIGS. 5, 6 and 7 shows examples of nine (three in each FIG.) 256×256 pixels binary input images paired with the corresponding 256×256 pixels RGB target images. Finally, the generated training dataset was used to train the cGAN from scratch using the Adam optimiser ([19] "Kingma, D. P, & Ba, J. (2014). *Adam: A method for stochastic optimization, arXiv preprint arXiv:1412.6980*") with a batch size of 4 and an initial learning rate of 0.0002 for 50 epochs. A Python ([21] "*Team, P C. (2019). Python: a dynamic, open source programming language, version 3.6.8. Python Software Foundation, Wilmington, DE*") code based on the TensorFlow 1.14 implementation of pix2pix cGAN developed by [20] was used to train the cGAN.

Figure 8:
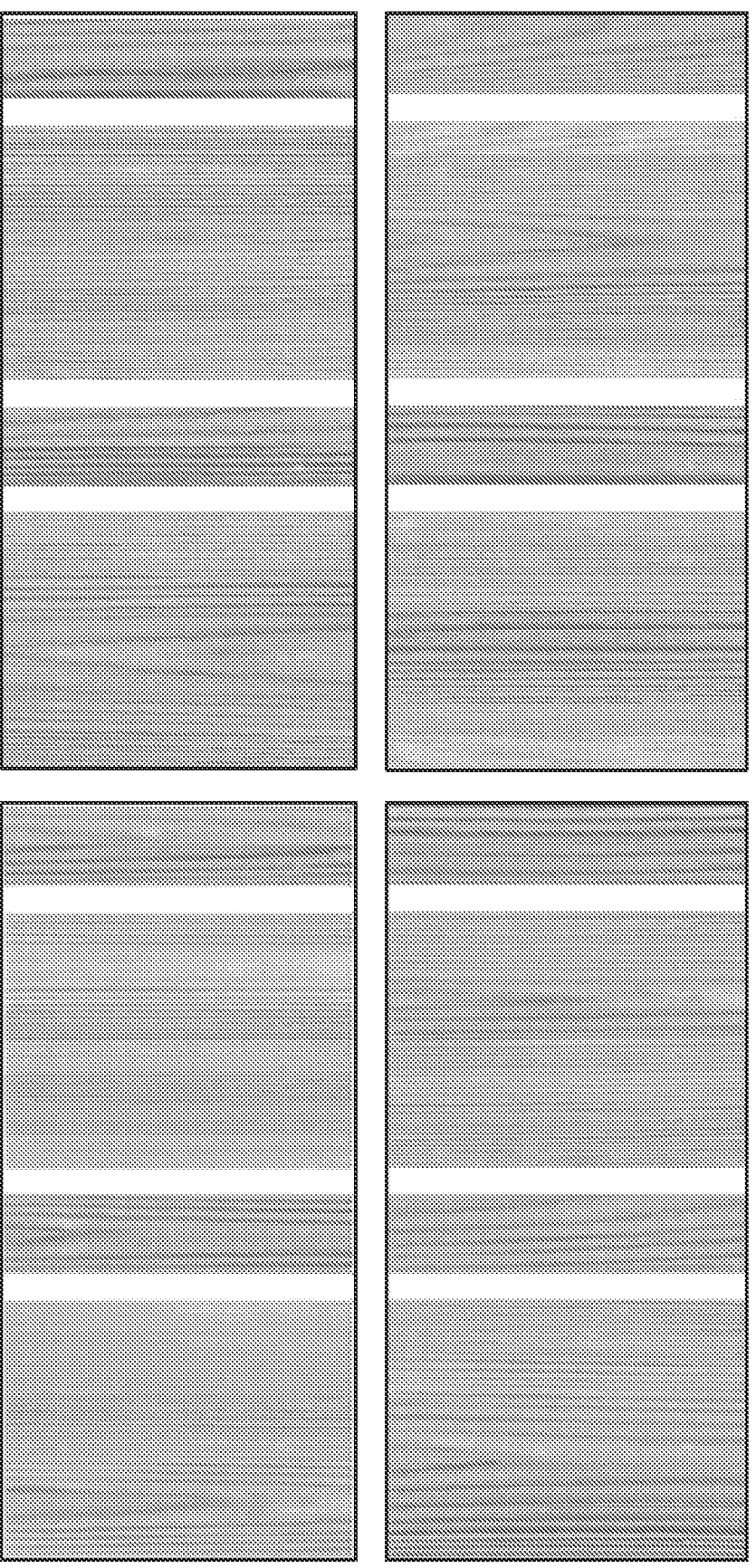
FIG. 8 shows translated photorealistic RGB surface images of four virtual timber boards produced using the trained cGAN according to the Example given below.
Figure 9:
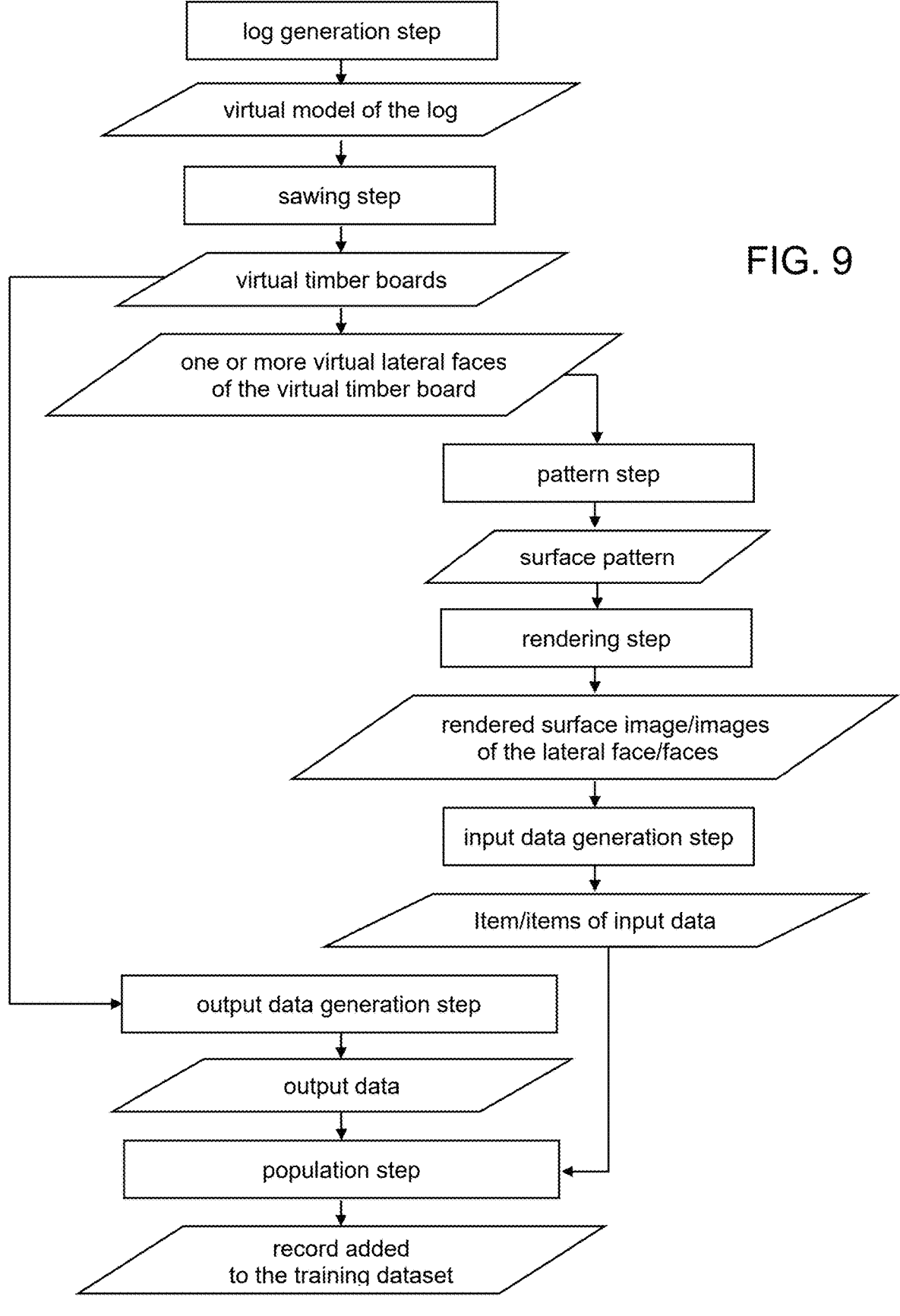
FIG. 9 shows a flow chart of the main steps of the method of the present invention.

Once the cGAN had been trained, since the training had been done over images of 256×256 pixels, the first step in applying the trained network in the rendering step, was to partition the binary surface images of the virtually sawn boards (showing the surface pattern—see FIG. 4b), into images of size 256×256 pixels. Then, the trained cGAN was applied on the resulting 256×256 pixels binary images to generate corresponding rendered RGB images that were finally stitched together to form the surface of the virtual timber boards. The binary images of all the generated 3000 virtual timber boards were translated to RGB rendered images in a similar manner. FIG. 8 shows the four sides of four example boards, where their binary surface images have been translated to rendered RGB surface images by using the trained cGAN.

Finally, the translated rendered images of the virtual timber boards together with their known pith locations have been used to generate the input-output pairs of the training dataset (intended to be used to train the proposed deep learning algorithm, i.e. the 1D CNN, for automatic location of pith). For the input part of this training dataset, the grayscale light intensity of 42 sections along each of the 3000 virtual timber boards of length 205 mm (5 mm interval between evaluated sections along a board) were considered. This gave a total of 126,000 sections to be used for training and validation. In this specific Example, the grayscale light intensity input signals, which were obtained from the four sides of the virtual board sections at the same position along the longitudinal axis, were normalised between 0 and 1, resampled to a fixed size of 1024 data points, and stacked vertically as can be seen in FIG. 2. Thus, the size of the input part of the training dataset was 126,000 matrices of dimension 1024×4, while the size of the output part of the training dataset was 126,000 vectors of size 2×1, corresponding to the $\bar{x}$- and $\bar{y}$-coordinates of pith locations of the considered 126,000 sections.

The present invention achieves important advantages.

Thanks to the computer-implemented method developed in the present invention, it is now possible to properly train with a wide training dataset, any artificial neural network configured to use one or more images of the lateral faces of a timber board as input data and to provide information about structure and/or defects of the timber board as output data.

Finally, it should be noted that the present invention is relatively easy to implement and that the cost of implementation is not very high.

The invention claimed is:

1. A computer-implemented method for generating a training dataset for training a main artificial neural network, wherein the main artificial neural network is configured to use one or more images of lateral faces of a timber board as input data and to provide information about structure and/or defects of the timber board as output data, wherein each timber board comprises four lateral faces developing along a longitudinal axis of the timber board, the method including repeating a plurality of times the following steps:

a log generation step during which a virtual model of a log is generated, the virtual model comprising an internal structure and/or defects;

a sawing step during which the virtual model of the log is virtually sawn along virtual cutting planes, to obtain one or more virtual timber boards each having four virtual lateral faces developing along a longitudinal axis of the virtual timber board;

a pattern step during which, for one or more virtual lateral faces of virtual timber boards created in the sawing step, a surface pattern is determined as the intersection between the virtual lateral face and the internal structure and/or defects of the virtual model of the log;

a rendering step during which each surface pattern generated in the pattern step is used to create a rendered surface image of the corresponding lateral face of the virtual timber board; and an input data generation step during which the rendered surface images are used to create one or more item of input data for the main artificial neural network;

an output data generation step during which an item of output data is generated for each virtual timber board on the basis of the internal structure and/or defects of the virtual model of the log; and a population step during which, for each item of input data generated in the input data generation step, a record is added to the training dataset, the record comprising an input-output data pair comprising the item of input data, in combination with the item of output data generated in the output data generation step for the virtual timber board the item of input data refers to.

2. The computer-implemented method according to claim 1, wherein the log generation step comprises the following steps:

a basic cross-section generation step during which a basic cross-section is generated for the virtual model of the log;

an axial development step during which the basic cross-section is used to generated additional cross-sections of the virtual model of the log in different positions along the longitudinal axis; and a combination step during which the basic cross-section is combined with the additional cross-section to create the whole virtual model of the log.

3. The computer-implemented method according to claim 2 wherein the basic cross-section generation step comprises the following steps:

a contour definition step during which a pith position is defined, and an external contour of the basic cross-section is generated with reference to the pith position; and a ring generation step during which annual growth rings are defined in between the pith position and the external contour.

4. The computer-implemented method according to claim 3, in which the ring generation step is executed by shaping annual rings according to the external contour and by applying a distance between subsequent rings corresponding to a measured ring profile of annual growth rings of a real log.

5. The computer-implemented method according to claim 2, in which the basic cross-section generation step is based on a stochastic model.

6. The computer-implemented method according to claim 3, in which the basic cross-section generation step is based on a stochastic model, wherein the stochastic model is based on the assumption that the lengths of two different segments extending from the pith location to two distinct points of the external contour, correlate such that a correlation coefficient between the two segments is an auto-correlation function of the angle that the two segments form between them.

7. The computer-implemented method according to claim 2, wherein, the log generation step further comprises at least one of the following additional steps:

a heartwood and/or sapwood generation step, during which virtual heartwood and/or virtual sapwood are inserted in the virtual model of the log;

a bark generation step, during which a virtual bark is inserted in the virtual model of the log;

a grain insertion step, during which a virtual grain direction is applied to the virtual model of the log.

8. The computer-implemented method according to claim 7, wherein said additional steps are first executed during the basic cross-section generation step.

9. The computer-implemented method according to claim 2, wherein, during the axial development step, the generation of an additional cross-section at a given distance along the longitudinal axis of the virtual model of the log comprises a tapering step during which the cross-section is reduced as a function of the given distance.

10. The computer-implemented method according to claim 9, wherein, during the axial development step, the generation of the additional cross-section at the given distance along the longitudinal axis of the virtual model of the log further comprises at least one of a crooking step and a twisting step, during the crooking step a pith location of the additional cross-section being displaced in a plane perpendicular to the longitudinal axis passing through the pith location at the basic cross-section, and during the twisting step the additional cross-section being rotated around the longitudinal axis.

11. The computer-implemented method according to claim 2, wherein the log generation step further comprises a defect insertion step, during which one or more defects are introduced in the virtual model of the log generated in the combination step.

12. The computer-implemented method according to claim 11, wherein the defect insertion step comprises at least one execution of at least one of the following steps:

a node insertion step, during which a node extending outwards from the longitudinal axis is inserted at a node position along the longitudinal axis;

an inclusion insertion step, during which a defective volume is included in the virtual model of the log, the defective volume representing a pocket of resin, a blue stain or a different defect;

a deformation insertion step, during which cross-sections along a portion of the longitudinal axis of the virtual model of the log are deformed;

a missing part insertion step, during which at least one of a heavy rot, a generic hole, an insect hole, a crack, a shake or a split is inserted in the virtual model of the log.

13. The computer-implemented method according to claim 11, wherein the defect insertion step is based on a stochastic model.

14. The computer-implemented method according to claim 1, wherein the sawing step is executed by applying a predefined cutting scheme to the virtual model of the log and/or by randomly positioning virtual cutting planes in the virtual model of the log.

15. The computer-implemented method according to claim 1, wherein during the pattern step a surface image is created representing the internal structure and/or defects of the virtual model of the log at the lateral face.

16. The computer-implemented method according to claim 15, wherein during the rendering step a trained secondary artificial neural network is used to translate the surface image into a rendered surface image.

17. The computer-implemented method according to claim 16, wherein during the rendering step:

the surface image is partitioned into a plurality of working images of predetermined dimension;

each working image is inputted into the trained secondary artificial neural network which translates the working image into a rendered working image;

so obtained rendered working images are combined together according to the partitioning of the surface image to create the rendered surface image of the lateral face of the virtual timber board.

18. The computer-implemented method according to claim 1, wherein during the input data generation step one item of input data is created alternatively as:

a single whole rendered surface image; or a set of two or three rendered surface images of lateral faces of the same virtual timber board; or a set of all rendered surface images of the four lateral faces of the same virtual timber board; or a portion of a single rendered surface image;

a set of two or three portions of distinct rendered surface images of lateral faces of the same virtual timber board, corresponding to parts of the lateral faces positioned at a same position along the longitudinal axis; or a set of portions of distinct rendered surface images of all four lateral faces of the same virtual timber board, corresponding to parts of the lateral faces positioned at a same position along the longitudinal axis;

wherein each of said portions is a bidimensional or a one-dimensional image.

19. The computer-implemented method according to claim 1, wherein, during the rendering step, each surface pattern generated in the pattern step is used to create a rendered surface image which, alternatively, is:

a photorealistic surface image;

a non-photorealistic surface image representing information corresponding to those which can be acquired by an optical scanner framing a surface of the virtual lateral face lightened with a structured light constituted by laser dots;

a non-photorealistic surface image representing information corresponding to those which can be acquired by an optical scanner framing the surface of the virtual lateral face lightened with a structured light constituted laser lines;

another kind of non-photorealistic surface image representing information corresponding to what can be acquired using an optical scanner framing the surface of the virtual lateral face under different lightening conditions.

20. A non-transitory computer readable storage medium storing one or more programs, the one or more programs comprising instructions, which when executed by an electronic device with one or more processors, cause the device to carry out the method of claim 1.

21. A computer system, comprising one or more processors and a non-transitory computer readable storage medium storing one or more programs configured to be executed by the one or more processors, the one or more programs comprising instructions that, when executed by the one or more processors, cause the computer system to carry out the method of claim 1.

22. A computer system, comprising one or more processors and a non-transitory computer readable storage medium storing one or more programs configured to be executed by the one or more processors, the one or more programs comprising instructions that, when executed by the one or more processors, cause the computer system to run a main artificial neural network, wherein each timber board comprises four lateral faces developing along a longitudinal axis of the timber board, wherein the main artificial neural network is configured to use one or more images of the lateral faces as input data and to provide information about structure and/or defects of the timber board as output data, and wherein the main artificial neural network has been trained with a training dataset generated with the method according to claim 1.

* * * * *